United States Patent
Shaikh

(10) Patent No.: US 8,630,607 B2
(45) Date of Patent: Jan. 14, 2014

(54) EMERGENCY CALL HANDOFF BETWEEN HETEROGENEOUS NETWORKS

(75) Inventor: Imtiyaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 243 days.

(21) Appl. No.: 13/183,758

(22) Filed: Jul. 15, 2011

(65) Prior Publication Data
US 2013/0017801 A1 Jan. 17, 2013

(51) Int. Cl.
*H04M 11/04* (2006.01)
*H04M 1/00* (2006.01)
*H04W 4/00* (2009.01)
*H04L 12/66* (2006.01)

(52) U.S. Cl.
USPC ............. 455/404.1; 455/552.1; 370/331; 370/352; 379/45; 379/37

(58) Field of Classification Search
USPC ............ 455/404.1, 552.1; 370/331, 338, 352; 379/45, 37
See application file for complete search history.

(56) References Cited

U.S. PATENT DOCUMENTS

| | | | |
|---|---|---|---|
| 2007/0015536 A1* | 1/2007 | LaBauve et al. | 455/552.1 |
| 2010/0255808 A1* | 10/2010 | Guo et al. | 455/404.1 |
| 2010/0311386 A1* | 12/2010 | Edge et al. | 455/404.1 |
| 2011/0032906 A1* | 2/2011 | Mutikainen et al. | 370/331 |
| 2011/0244824 A1* | 10/2011 | Hursey et al. | 455/404.1 |

OTHER PUBLICATIONS $3^{rd}$ Generation Partnership Project 2 (3GPP2), "E-UTRAN—eHRPD Connectivity and Interworking: Core Network Aspects", 3GPP2X.S0057-0, Version 3.0, Sep. 17, 2010, 195 pages.

\* cited by examiner

*Primary Examiner* — Opiribo Georgewill

(57) ABSTRACT

A system to receive, from a user device, a request to establish a communication session to allow an emergency call to be placed or transferred to a public safety access point (PSAP) server; determine whether the request includes a first indication that the emergency call is being initiated via the user device or a second indication that the emergency call is being handed off from a base station associated with another network device, place the emergency call, to the PSAP server and via a first gateway device associated with the network device, when the request includes the first indication; and transfer the emergency call, to the PSAP server and via a second gateway device associated with the other network device, when the request includes the second indication, where the second gateway device processed the emergency call prior to being handed off from the base station.

12 Claims, 6 Drawing Sheets

EMERGENCY CALL HANDOFF BETWEEN HETEROGENEOUS NETWORKS

BACKGROUND

Evolved Packet System (EPS) is a network architecture associated with the third generation partnership project (3GPP) wireless communication standard. The EPS includes an evolved packet core (EPC) through which traffic, associated with a communication session with a user device, is transported to and/or received from a network (e.g., the Internet, a packet data network, etc.). The EPS also includes a long term evolution (LTE) network, which is a radio access network (RAN) via which the user device communicates with the EPC during the communication session. The EPS is capable of processing various types of traffic (e.g., video, voice, text, etc.) at higher throughput and/or bandwidth than previous generation architectures (e.g., pre-3GPP networks).

However, when a user device is being handed off between a LTE network and a non-LTE network (e.g., a network that is based on the previous generation architectures), an emergency call, placed by the user device, may be dropped during the handoff, may be routed to a different public safety answering point (e.g., a dispatcher), and/or may be processed within a time period that is greater than a processing time threshold for emergency calls.

DETAILED DESCRIPTION OF PREFERRED EMBODIMENTS

The following detailed description refers to the accompanying drawings. The same reference numbers in different drawings may identify the same or similar elements.

Systems and/or methods, described herein, may enable an emergency call (e.g., such as a 911 call in the United States, a 112 call in Europe, etc.), that has been established with a public safety access point (PSAP) server, to be handed off between a long term evolution (LTE) network and another network that is not a LTE network. The systems and/or methods may allow a network, to which the user device is being handed off, to distinguish between an emergency call that is being initiated by the user device and an emergency call that is being handed off.

The systems and/or methods may allow the network, based on a determination that the emergency call is associated with a handoff, to obtain information that identifies a packet data network (PDN) gateway (PGW) device, associated with the other network, via which the emergency call was placed prior to being handed off. The network may forward the emergency call to the identified PGW device, associated with the other network, rather than via another PGW device, associated with the network. Routing the emergency call to the identified PGW device may enable the emergency call to be maintained during the handoff. Routing the emergency call, via the identified PGW device, may also allow the call to be placed within a time period that is less than another time period associated with handing over a normal call (e.g., a call that is not associated with an emergency call) or a time period associated with establishing another emergency call between the user device and the PSAP via the other PGW.

Figure 1:
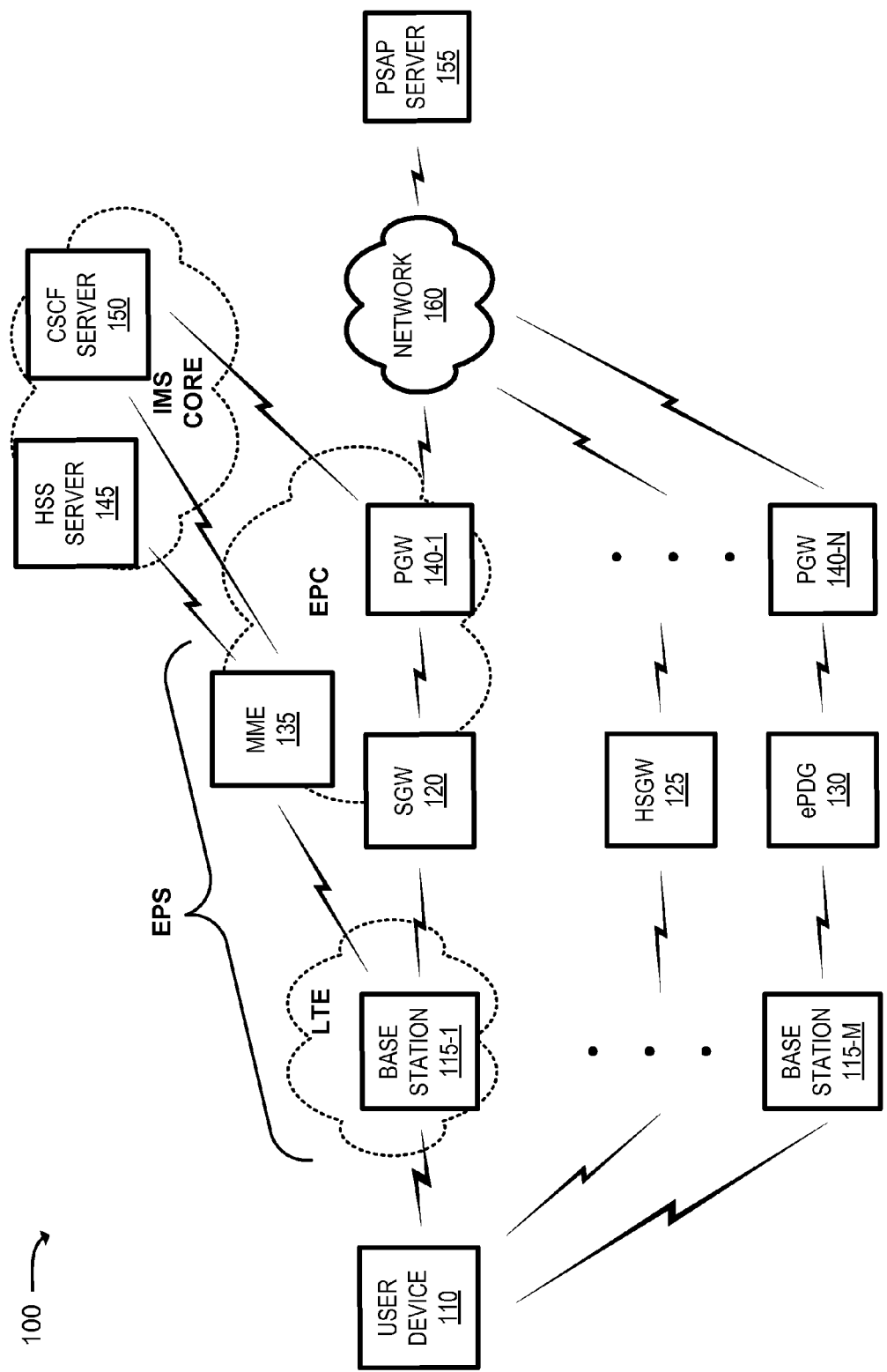
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a user device 110, a group of base stations 115-1, . . . , 115-M (where M≥1) (hereinafter referred to collectively as "base stations 115" and individually as "base station 115"), a serving gateway 120 (hereinafter referred to as "SGW 120"), an evolved high rate packet data (eHRPD) serving gateway (HSGW) 125 (hereinafter referred to as "HSGW 125"), an enhanced packet data gateway (ePDG) 130 (hereinafter referred to as "ePDG 130"), a mobility management entity device 135 (hereinafter referred to as "MME 135"), a group of packet data network (PDN) gateways (PGW) 140-1, . . . , 140-N (where N≥1) (hereinafter referred to collectively as "PGWs 140" and individually as "PGW 140"), a home subscriber server (HSS)/authentication, authorization, accounting (AAA) server 145 (hereinafter referred to as an "HSS server 145"), a call session control function (CSCF) server 150 (hereinafter referred to as "CSCF server 150"), a public safety access (or answering) point (PSAP) server 155 (hereinafter referred to as a "PSAP server 155"), and a network 160. The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1.

Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

Environment 100 may include an evolved packet system (EPS) that includes a long term evolution (LTE) network and/or an evolved packet core (EPC) that operate based on a third generation partnership project (3GPP) wireless communication standard. The LTE may be a radio access network (RAN) that includes one or more base stations 115-1 that take the form of evolved Node Bs (eNBs) via which user device 110 communicates with the EPC. The EPC may include SGW 120, MME 135, and/or PGW 140-1 that enable user device 110 to communicate with network 160 and/or an Internet protocol (IP) multimedia subsystem (IMS) core. The IMS core may include HSS server 145 and/or CSCF server 150 and may manage authentication, session initiation, account information, profile information, etc. associated with user device 110.

User device 110 may include any computation or communication device, such as a wireless mobile communication device that is capable of communicating with base station 115. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a camera, a personal gaming system, or another type of mobile computation or communication device.

Base station 115 may include one or more devices that receive, process, and/or transmit traffic, such as voice, video, text, and/or other data, destined for and/or received from user device 110. In an example implementation, base station 115 may be an eNB associated with the LTE network that receives traffic (e.g., such as an emergency call) from and/or sends traffic to PSAP server 155 via SGW 120. Base station 115 may send traffic to and/or receive traffic from user device 110 via an air interface.

In another example implementation, base station 115 may be an eHRPD-based device associated with a RAN that is not a LTE network. Base station 115 may receive traffic (e.g., such as an emergency call) from and/or send traffic to PSAP server 155 via HSGW 125. Base station 115 may send traffic to and/or receive traffic from user device 110 via another air interface.

In another example implementation, base station 115 may be a wireless access point (e.g., a Wifi hotspot, a wireless router, etc.) that is not associated with a LTE network. Base station 115 may receive traffic from and/or send traffic to PSAP server 155 via ePDG 130. Base station 115 may send traffic (e.g., such as an emergency call) to and/or receive traffic from user device 110 via another air interface.

SGW 120 may include one or more computation or communication devices that gather, process, search, store, and/or provide information in a manner described herein. SGW 120 may, for example, aggregate traffic received from one or more base stations 115 (e.g., eNBs), associated with the LTE, and may send the aggregated traffic to network 160 (e.g., via PGW 140) and/or other devices associated with the IMS core and/or the EPC. SGW 120 may also receive traffic from the other network devices and/or may send the received traffic to user device 110 via base station 115. SGW 120 may perform operations associated with handing off user device 110 from and/or to the LTE network.

HSGW 125 may include one or more computation or communication devices that gather, process, search, store, and/or provide information in a manner described herein. HSGW 125 may, for example, aggregate traffic received from one or more base stations 115 (e.g., eHRPDs) and may send the aggregated traffic to network 160 (e.g., via PGW 140). HSGW 125 may also receive traffic from the other network devices and/or may send the received traffic to user device 110 via base station 115. HSGW 125 may perform operations associated with handing off user device 110 from and/or to the LTE network and/or another network.

ePDG 130 may include one or more computation or communication devices that gather, process, search, store, and/or provide information in a manner described herein. ePDG 130 may, for example, aggregate traffic received from one or more base stations 115 (e.g., Wifi hotspots) and may send the aggregated traffic to network 160 (e.g., via PGW 140). ePDG 130 may also receive traffic from the other network devices and/or may send the received traffic to user device 110 via base station 115. ePDG 130 may perform operations associated with handing off user device 110 from and/or to the LTE network and/or another network.

MME 135 may include one or more computation or communication devices that gather, process, search, store, and/or provide information in a manner described herein. For example, MME 135 may perform operations associated with handing off user device 110 between the LTE and other base stations 115 associated with architectures that are not based on the 3GPP standard. In another example, MME 135 may perform an operation associated with handing off user device 110, from base station 115-1 to another base station 115 (e.g., such as base stations 115-2, 115-M, etc.), when user device 110 has placed an emergency call, to PSAP server 155, via base station 115-1. MME 135 may, in yet another example, perform an operation to handoff user device 110 from the other base station 115 to base station 115-1 when user device 110 has placed an emergency call, to PSAP server 155, via the other base station 115.

PGW 140 may include one or more computation or communication devices that gather, process, search, store, and/or provide information in a manner described herein. In one example implementation, PGW 140 may include a device that aggregates traffic received from one or more SGWs 120, HSGWs 125, ePDGs 130, etc. and may send the aggregated traffic to network 160. In another example implementation, PGW 140 may receive traffic from network 160 and may send the traffic toward user device 110 via SGW 120, HSGW 125, and/or ePDG 130.

HSS server 145 may include one or more server devices, or other types of computation or communication devices, that gather, process, search, store, and/or provide information in a manner described herein. For example, HSS server 145 may manage, update, and/or store, in a memory associated with HSS server 145, service profile information associated with user device 110 that includes access point names (APNs) that are permitted for and/or accessible by user device 110, information associated with a user of user device 110 (e.g., a username, a password, a personal identification number (PIN), etc.), rate information, minutes allowed, and/or other information. HSS server 145 may store context information associated with user device 110, which may identify via which PGW 140 user device 110 was communicating when placing an emergency call to PSAP server 155. HSS server 145 may transmit the context information to a particular base station 115 to which user device 110 is being handed off and/or to a gateway device (e.g., SGW 120, HSGW 125, ePDG 130, etc.) via which the particular base station 115 communicates. Additionally, or alternatively, HSS server 145 may include a device that performs authentication, authorization, and/or accounting (AAA) operations associated with a communication session with user device 110.

CSCF server 150 may include one or more server devices, or other types of computation or communication devices, that gather, process, search, store, and/or provide information in a manner described herein. CSCF server 150 may process and/or route calls to and from user device 110 via the EPC. For example, CSCF server 150 may process calls, received from network 160, that are destined for user device 110. In another example, CSCF server 150 may process calls, received from user device 110, that are destined for network 160.

In one example implementation, CSCF server 150 may identify to which PSAP server 155 an emergency call, received from user device 110, is to be routed based on a location associated with user device 110, a particular base station 115 via which user device 110 placed the emergency call, etc.

PSAP server 155 may include one or more server devices, or other types of computation or communication devices, that gather, process, search, store, and/or provide information. For example, PSAP server 155 may process emergency calls received from user devices 110 via network 160. PSAP server 155 may enable a user of user device 110 to communicate with a dispatcher associated with PSAP server 155.

Network 160 may include one or more wired and/or wireless networks. For example, network 160 may include a cellular network, a public land mobile network (PLMN), a second generation (2G) network, a third generation (3G)

network, a fourth generation (4G) network, a fifth generation (5G) network, and/or another network. Additionally, or alternatively, network 160 may include a wide area network (WAN), a metropolitan network (MAN), an ad hoc network, an intranet, the Internet, a fiber optic-based network (e.g., a FiOS network), and/or a combination of these or other types of networks. Network 160 may include nodes via which traffic is transported to and/or from the EPS (e.g., via PGW 140) and/or another network.

Figure 2:
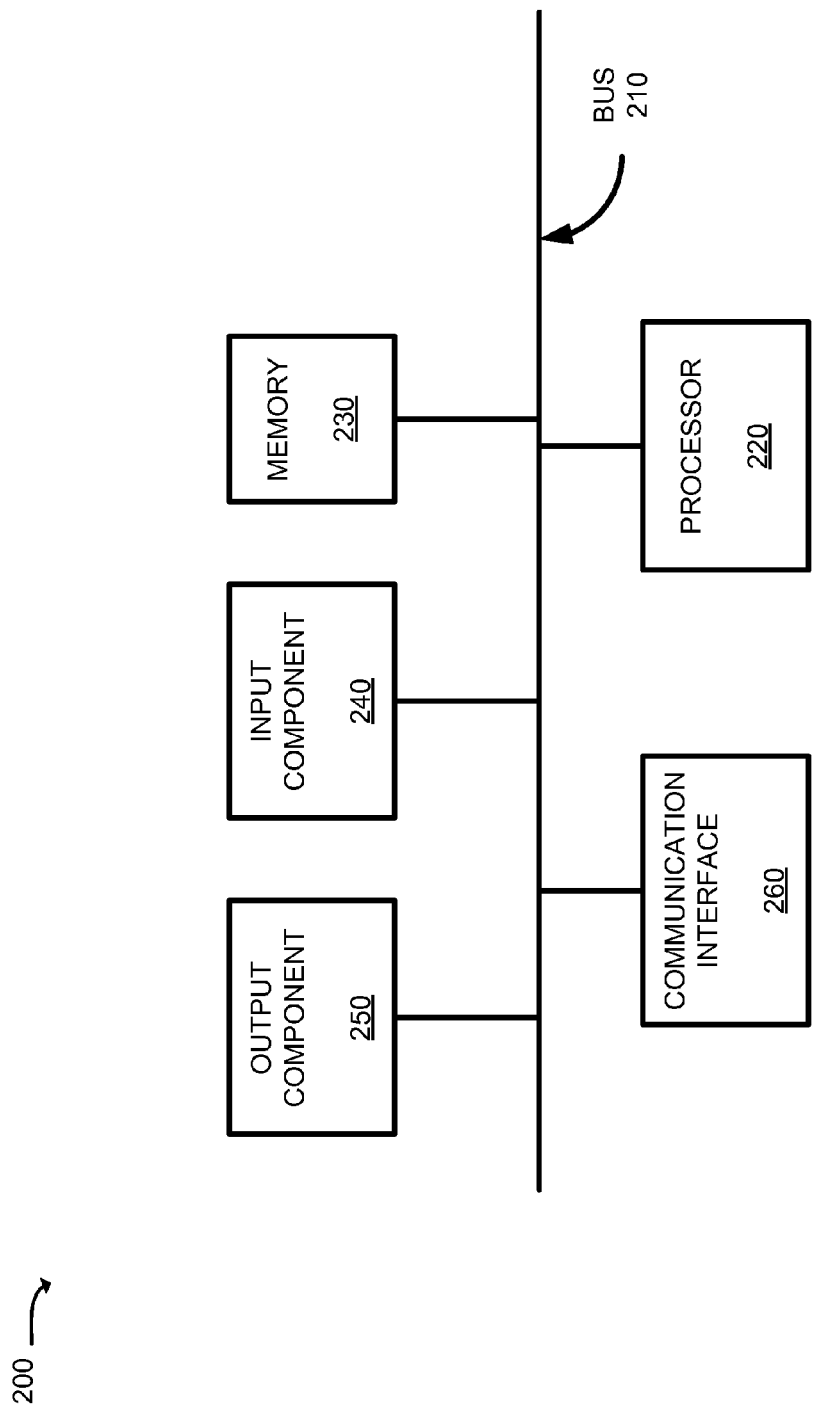
FIG. 2 is a diagram of example components of one or more of the devices of FIG. 1.

FIG. 2 is a diagram of example components of a device 200. Device 200 may correspond to user device 110, SGW 120, HSGW 125, ePDG 130, MME 135, PGW 140, HSS server 145, CSCF server 150, and/or PSAP server 155. Alternatively, or additionally, each of user device 110, SGW 120, HSGW 125, ePDG 130, MME 135, PGW 140, HSS server 145, CSCF server 150, and/or PSAP server 155 may include one or more devices 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as network 185. In one alternative implementation, communication interface 260 may be a logical component that includes input and output ports, input and output systems, and/or other input and output components that facilitate the transmission of data to other devices.

As will be described in detail below, device 200 may perform certain operations relating handing off emergency calls. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
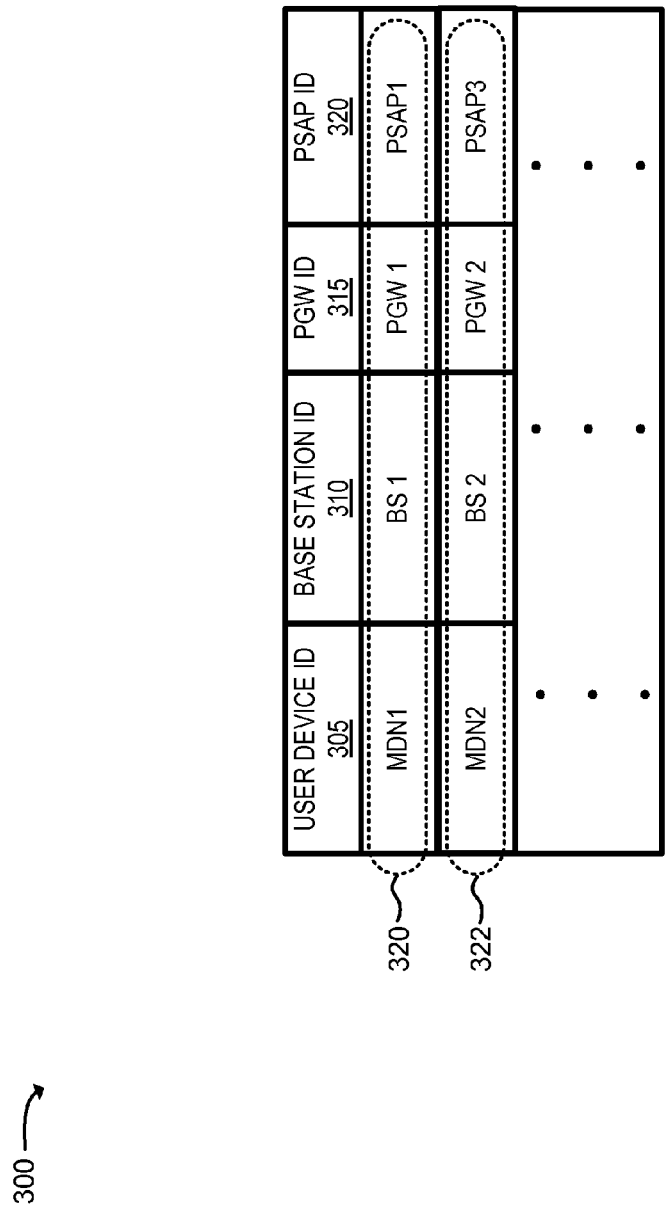
FIG. 3 is a diagram of an example data structure for storing context information associated with a user device, according to an implementation described herein.

FIG. 3 is a diagram of an example data structure 300 for storing context information associated with user device 110, according to an implementation described herein. Data structure 300 may store context information, associated with user device 110, that is used to handoff user device 110 between base stations 115 when an emergency call has been placed by user device 110. Data structure 300 may be stored by HSS server 145. As illustrated in FIG. 3, data structure 300 may store a collection of fields, such as a user device identifier (ID) field 305, a base station ID field 310, a PGW ID field 315, and a PSAP ID field 320. Data structure 300 includes fields 305-315 for explanatory purposes. In practice, data structure 300 may include additional fields, fewer fields, different fields, and/or differently arranged fields than are described with respect to data structure 300.

User device ID field 305 may store information associated with user device 110 that is being handed off from a particular base station 115 to another base station 115. The information, associated with user device 110, may include, for example, a device identifier (e.g., a mobile director number (MDN), etc.), a network address (e.g., a media access control (MAC) address, an Internet protocol (IP) address), etc. associated with user device 110. Base station ID field 310 may store information associated with the particular base station 115 from which user device 110 is being handed off. For example, the information associated with the particular base station 115 may include a device identifier, a network address (e.g., a MAC address, etc.) associated with the particular base station 115.

PGW ID field 315 may store information associated with PGW 140 via which the particular base station 115 was communicating, to establish the call placed by user device 110, before user device 110 is handed off to the other base station 115. PGW 140, in this example, may be referred to as an anchor PGW 140. PSAP ID field 315 may store information that identifies to which PSAP server 155 an emergency call is to be routed before being handed off to the other base station 115.

For example, user device 110 may place an emergency call and may communicate with PSAP server 155 via signal bearers, such as base station 115-1 (e.g., when base station 115-1 is an eNB), SGW 120, and/or PGW 140-1. When the call is placed from user device 110, HSS server 145 may store, in data structure 300, information associated with user device 110 (e.g., MDN1) and/or information that identifies via which base station 115 (e.g., BS 1) user device 110 is communicating (e.g., as shown by ellipse 320). HSS server 145 may also store information that identifies via which PGW 140 (e.g., PGW 1) the call is routed and/or information that identifies to which PSAP server 155 (e.g., PSAP1) the call is to be routed (e.g., as shown by ellipse 320).

In another example, user device 110 may place an emergency call that is routed to PSAP server 155 via other signal bearers, such as base station 115-2 (e.g., when base station 115-2 is an eHRPD), HSGW 125, and/or PGW 140-2. In yet another example, user device 110 may place an emergency call that is routed to PSAP server 155 via further signal bearers, such as base station 115-M (e.g., when base station 115-M is a wireless access point, such as a wireless router, a Wifi hotspot, etc.), ePDG 130, and/or PGW 140-N. HSS server 145 may, for example, store information associated with another user device 110 (e.g., MDN2) and/or information that identifies via which other base stations 115 (e.g., BS 2) the other user device 110 is communicating (e.g., as shown by ellipse 322). HSS server 145 may also store information that identifies via which other PGW 140 (e.g., PGW 2) the other call is routed and/or information that identifies to which other PSAP server 155 (e.g., PSAP3) the call is routed (e.g., as shown by ellipse 322).

Figure 4:
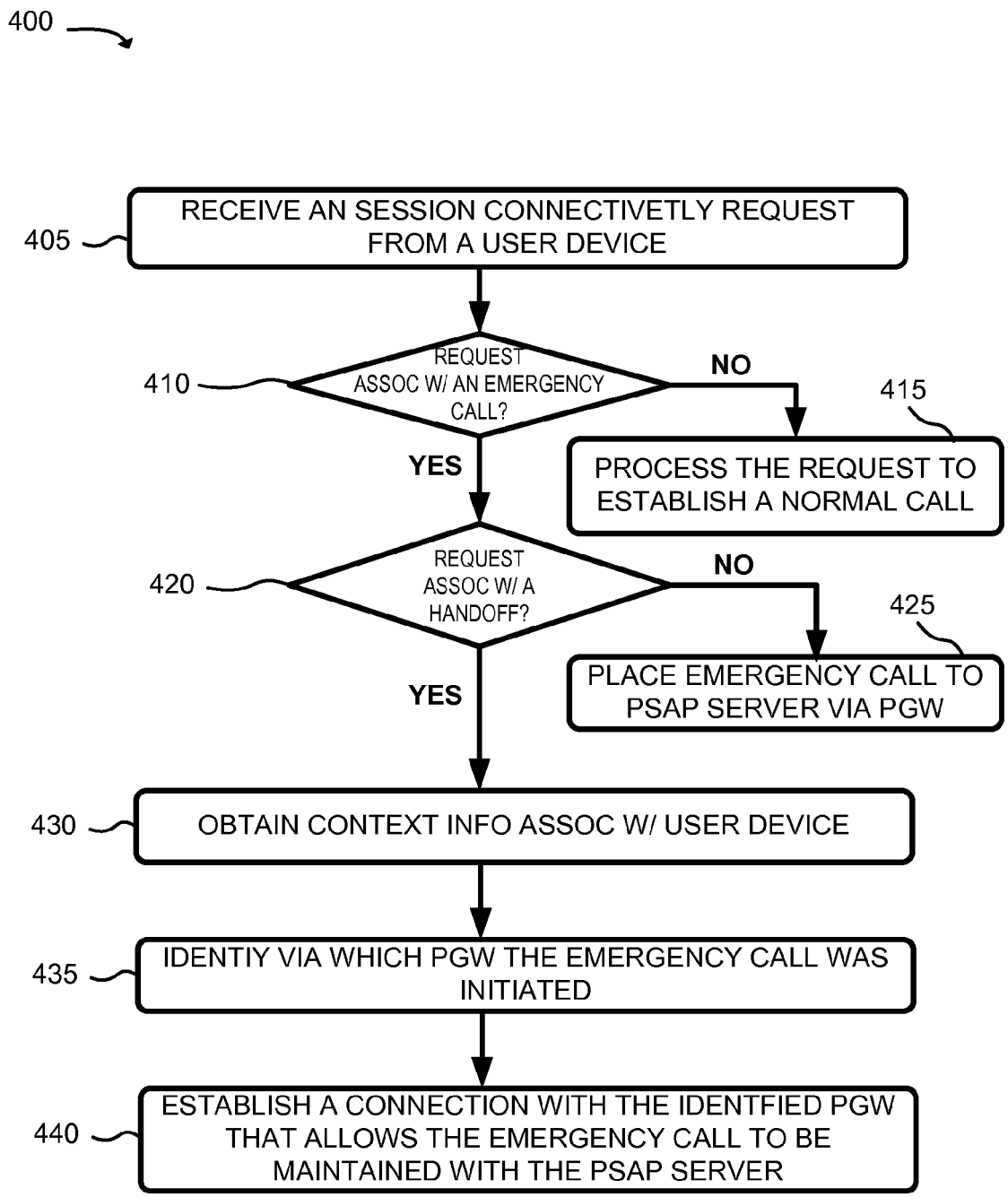
FIG. 4 is a flow chart of an example process for processing emergency calls from a user device being handed to a long term evolution (LTE) network from another network.

FIG. 4 is a flow chart of an example process 400 for processing emergency calls from user device 110 being handed off to a LTE network from another network. In one example implementation, process 400 may be performed by SGW 120, HSGW 125, ePDG 130, and/or PGW 140. In another example implementation, some or all of process 400 may be performed by a device or collection of devices separate from, or in combination with SGW 120, HSGW 125, ePDG 130, and/or PGW 140.

As shown in FIG. 4, process 400 may include receiving a session connectivity request from a user device (block 405), and determining whether the request is associated with an emergency call (block 410). If the request is not associated with an emergency call (block 410—NO), process 400 may include processing the request to establish a normal call (block 415). For example, user device 110 may transmit, to MME 135 and via base station 115-1, a session connectivity request that allows user device 110 to place a call. MME 135 may receive the request and may determine whether the request includes an emergency indication that the call is an emergency call. Based on a determination that the request does not include the emergency indication, MME 135 may process the call as a normal call. For example, MME 135 may, as a result of determining that the call is a normal call, communicate with HSS server 145 to authenticate user device 110. In another example, MME 135 may communicate with SGW 120 and/or PGW 140-1 to establish signal bearers, via which the call is to be placed to a destination device (e.g., via network 160).

As also shown in FIG. 4, if the request is associated with an emergency call (block 410—YES), process 400 may include determining whether the request is associated with a handoff (block 420). If the request is not associated with a handoff (block 420—NO), process 400 may include placing the emergency call to a PSAP server via a PGW (block 425). For example, MME 135 may receive the request and may determine that the request includes the emergency indication that the call is an emergency call. In one example, the emergency indication may correspond to a non-access stratum (NAS) request associated with an attach type associated with an emergency call.

Based on a determination that the request includes the emergency indication, MME 135 may determine whether the emergency call was initiated, by user device 110, via base station 115-1 or is being handed off to base station 115-1 from another base station 115. For example, MME 135 may determine whether the emergency indication corresponds to a first indication that the emergency call is being initiated via base station 115-1 or whether the indication corresponds to a second indication that the call is being handed off to base station 115-1 from another base station 115. In one example, the first indication may be associated with a NAS request corresponding to an emergency call initiation (e.g., attach type=emergency-initial (I)). In another example, the second indication may be associated with another NAS request corresponding to an emergency call handoff (e.g., attach type=emergency-handoff (HO)).

Based on an indication that the request includes the first indication, MME 135 may determine that the emergency call is being initiated, by user device 110, via base station 115-1. MME 135 may establish the emergency call by communicating with HSS server 145 to authenticate user device 110. MME 135 may route the emergency call via PGW 140-1 based on a determination that the user device 110 is authenticated. MME 135 may route the emergency call via another PGW 140, based on a determination that user device 110 cannot be authenticated.

MME 135 may, in another example, communicate with CSCF server 150 to identify to which PSAP server 155 the emergency call is to be placed. CSCF server 150 may, as a result of the communication, determine to which PSAP server 155 the emergency call is to be routed based on information associated with base station 115-1 via which the emergency call was initiated, a location associated with user device 110, etc. MME 135 may communicate with base station 115-1, SGW 120, and/or PGW 140-1 to establish signal bearers via which the emergency call is to be established with PSAP server 155.

As further shown in FIG. 4, if the request is associated with a handoff (block 420—YES), process 400 may include obtaining context information associated with the user device (block 430). For example, MME 135 may determine that the emergency indication corresponds to the second indication that the call is being handed off to base station 115-1 from another base station 115. The second indication may be associated with a NAS request corresponding to an emergency call handoff (e.g., attach type=emergency-HO).

Based on an indication that the request includes the second indication, MME 135 may obtain context information, associated with user device 110, from HSS server 145. The context information may identify to which PSAP server 155 the emergency call has been established and/or via which signal bearers (e.g., base station 115, SGW 120, HSGW 125, ePDG 130, PGW 140, etc.), the call was placed to the identified PSAP server 155. For example, when user device 110 places the emergency call via base station 115-1, the context information, associated with user device 110, may include information associated with user device 110 (e.g., an MDN, a MAC address, etc.), information associated with base station 115-1 (e.g., a device identifier, a MAC address, etc.), information associated with SGW 125 (e.g., a device identifier, a MAC address, etc.), information associated with PGW 140-1 (e.g., a device identifier, a MAC address, etc.), and/or information associated with PSAP server 155 (e.g., identified by CSCF server 150).

In another example, when user device 110 places the emergency call via base station 115-2, the context information may include the information associated with user device 110, information associated with base station 115-2, information associated with HSGW 125, information associated with PGW 140-2, and/or information associated with another PSAP server 155 (e.g., identified by CSCF server 150).

In yet another example, when user device 110 places the emergency call via base station 115-M, the context information may include the information associated with user device 110, information associated with base station 115-M, information associated with ePDG 130, information associated with PGW 140-N, and/or the information associated with a further PSAP server 155 (e.g., identified by CSCF server 150).

As yet further shown in FIG. 4, process 400 may include identifying via which PGW the emergency call was initiated (block 435) and establishing a connection with the identified PGW that allows the call to be maintained with the PSAP server (block 440). For example, MME 135 may identify, from the context information, that the emergency call was placed to PSAP server 155 via PGW 140-2 (e.g., when the emergency call was initiated via base station 115-2). Based on the identification that the emergency call, that was handed off from base station 115-2 to base station 115-1, was placed via PGW 140-2, MME 135 may instruct SGW 120 to communicate with PGW 140-2 to establish a connection that enables the emergency call to be maintained with PSAP server 155.

In another example, MME 135 may identify, from the context information, that the emergency call was placed to PSAP server 155 via PGW 140-N (e.g., when the emergency call was initiated via base station 115-M). Based on the identification that the emergency call, that was handed off from base station 115-M to base station 115-1, was placed via PGW 140-N, MME 135 may instruct SGW 120 to communicate with PGW 140-N to establish a connection that enables the emergency call to be maintained with PSAP server 155.

In yet another example, an emergency call may have been initiated, by user device 110, via base station 115-1 and/or other signal bearers (e.g., SGW 120, PGW 140-1, etc.) and is being handed off to base station 115-2 from base station 115-1. In this example, MME 135 may determine, in a manner similar to that described above (e.g., with respect to block 420—YES), that the emergency call includes an indication that the emergency call is being handed off and may obtain context information, associated with user device 110, from HSS server 145. MME 135 may determine, from the context information, that the emergency call was established via PGW 140-1 and may instruct HSGW 125 to communicate with PGW 140-1 to establish a connection that allows the emergency call to be maintained with PSAP server 155. MME 135 may in a manner similar to that described above, use the context information to process other emergency calls that are handed over from base station 115-1 to base station 115-M. MME 135 may instruct ePDG 130 to establish a connection with PGW 140-1 that allows the other emergency call to be maintained with PSAP server 155.

Figure 5A:
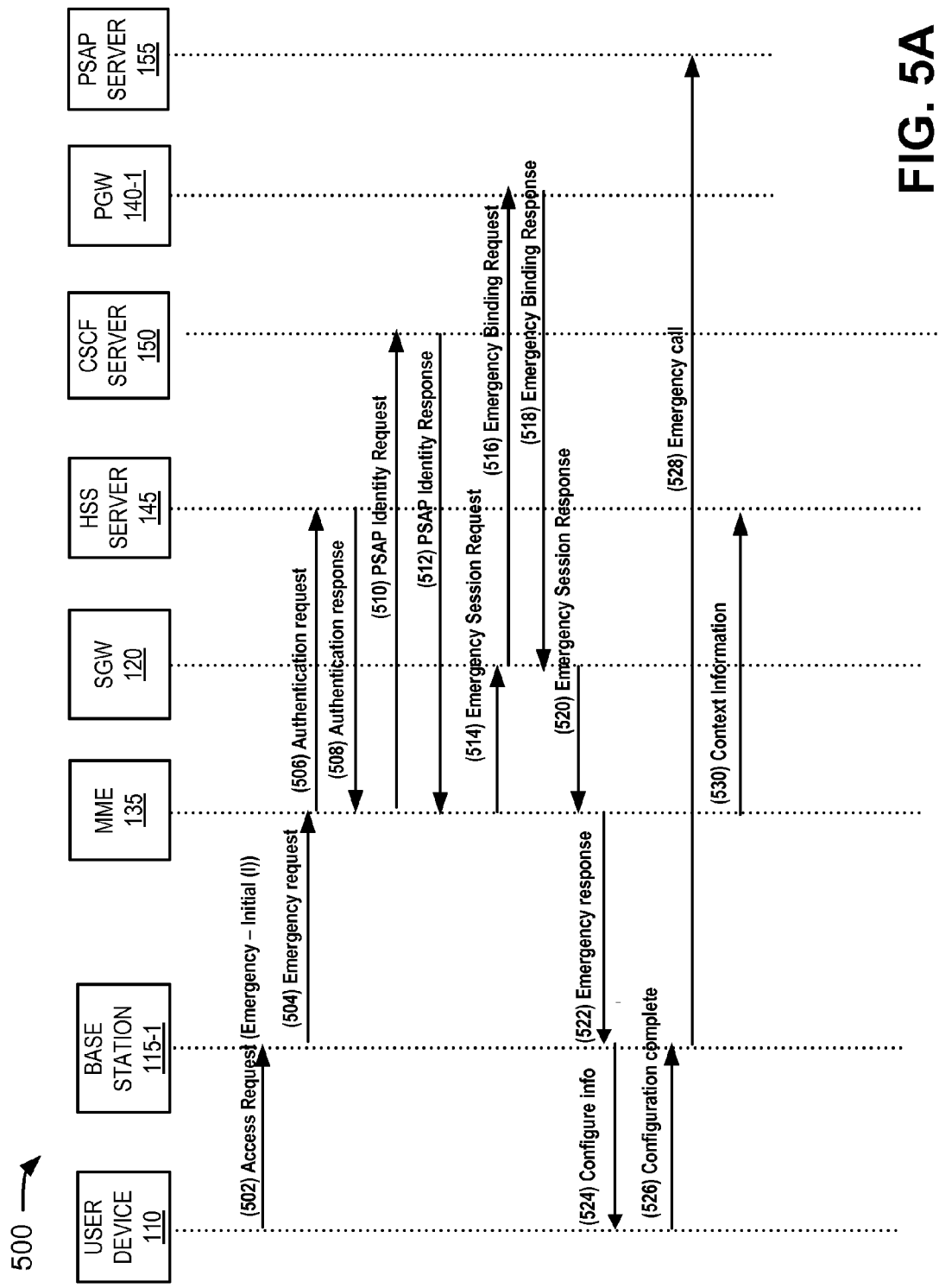
FIGS. 5A and 5B are diagrams of example interactions between devices of an example portion of the environment described above in FIG. 1.

FIG. 5A is a diagram of example interactions for initiating an emergency call between devices of an example portion 500 of the environment 100. As illustrated in FIG. 5A, example environment portion 500 may include user device 110, base station 115-1, SGW 120, MME 135, PGW 140-1, HSS server 145, CSCF server 150, and PSAP server 155. User device 110, base station 115-1, SGW 120, MME 135, PGW 140-1, HSS server 145, CSCF server 150, and PSAP server 155 may include the features described above in connection with one or more of FIGS. 1 and 2.

FIG. 5A describes example interactions, within example portion 500, for initiating an emergency call via signal bearers, such as base station 115-1, SGW 120, and/or PGW 140-1 for explanatory purposes. In another example, the interactions to initiate an emergency call could be described within another example portion 500 that includes other signal bearers, such as base station 115-2 (e.g., that corresponds to an eHRPD), HSGW 125, and/or PGW 140-2. In yet another example, the interactions to initiate an emergency call could be described within a further example portion 500 that includes further signal bearers, such as base station 115-M (e.g., that corresponds to a wireless access point, such as a Wifi hotspot, a wireless router, etc.), ePDG 130, and/or PGW 140-N.

As shown in FIG. 5A, user device 110 may transmit an access request 502 (emergency-initial (I)) to base station 115-1. Access request 502 may, in one example, include a NAS emergency indication (e.g., attach type=emergency-I) which may indicate that user device 110 is placing an emergency call. Base station 115-1 may receive access request 502 and may transmit an emergency request 504 to MME 135. MME 135 may receive emergency request 504 and may determine that emergency request 504 indicates that user device 110 is initiating an emergency call. MME 135 may transmit a request to authenticate user device 110, as authentication request 506, to HSS server 145. Authentication request 506 may include information associated with user device 110, such as a device identifier (e.g., MDN), a network address (e.g., a MAC address, an IP address, etc.), and/or information associated with a user of user device 110 (e.g., username, password, personal identification number, etc.). HSS server 145 may receive authentication request 506 and may authenticate user device 110 based on the information associated with user device 110. HSS server 145 may transmit an indication that user device 110 is authenticated, as authentication response 508, to MME 135.

MME 135 may receive authentication response 508 and may transmit a request to identify to which PSAP server 155 to transfer the emergency call, as PSAP identity request 510, to CSCF server 150. CSCF server 150 may receive PSAP identity request 510 and may identify PSAP server 155 that corresponds to information associated with base station 115-1 (e.g., a device identifier, a MAC address, etc.) obtained from PSAP identity request 510. In another example, CSCF server 150 may identify PSAP server 155 based on a location associated with user device 110 obtained from PSAP identity request 510 and/or from HSS server 145. CSCF server 150 may transmit an indication that the emergency call is to be transferred to PSAP server 155, as PSAP identity response 512, to MME 135.

MME 135 may receive PSAP identity response 512 and may transmit a request to establish an emergency session, associated with user device 110 and as emergency session request 514, to SGW 120. SGW 120 may receive emergency session request 514 and may transmit a request to establish NAT bindings for user device 110, as emergency binding request 516, to PGW 140-1. PGW 140-1 may receive emergency binding request 516 and may perform a NAT operation on user device 110. PGW 140-1 may transmit, to SGW 120, an IP address, assigned to user device 110 as a result of the NAT operation, as emergency binding response 518. SGW 120 may receive the IP address and may transmit an indication that the emergency session has been established, as emergency session response 520, to MME 135.

MME 135 may receive emergency session response 520 and may transmit another indication that the emergency session has been established, as emergency response 522, to base station 115-1. Base station 115-1 may receive emergency response 522 and may transmit configuration information, as configuration info 524, to user device 110. The configuration information may identify one or more access bearers (e.g., base station 115-1, SGW 120, PGW 140-1, etc.) via which to communicate during the emergency communication session. In another example, the configuration information may include frequencies, channels, protocols, etc. to be used, by user device 110, to communicate during the emergency communication session. In yet another example, the configuration information may include parameters to be used, by user device 110, to determine whether signal power, received from base station 115-1, is less than or equal to a particular threshold obtained from the configuration information.

User device 110 may receive configuration info 524, may use configuration info 524 to configure user device 110 to perform measurements associated with the received parameters, and may transmit an indication that user device 110 is configured to communicate with signal bearers, as configuration complete 526, to base station 115-1. Base station 115-1 may receive the indication that user device 110 is configured and may establish the emergency call, as emergency call 528, with PSAP server 155 and via SGW 120 and/or PGW 140-1. MME 135 may transmit context information 530, associated with user device 110, to HSS server 145. Context information 530 may include information associated with user device 110 (e.g., a MDN, a MAC address, etc.), and/or information associated with signal bearers, such as base station 115-1, SGW 120, PGW 140-1, etc., via which the emergency call is established.

Figure 5B:
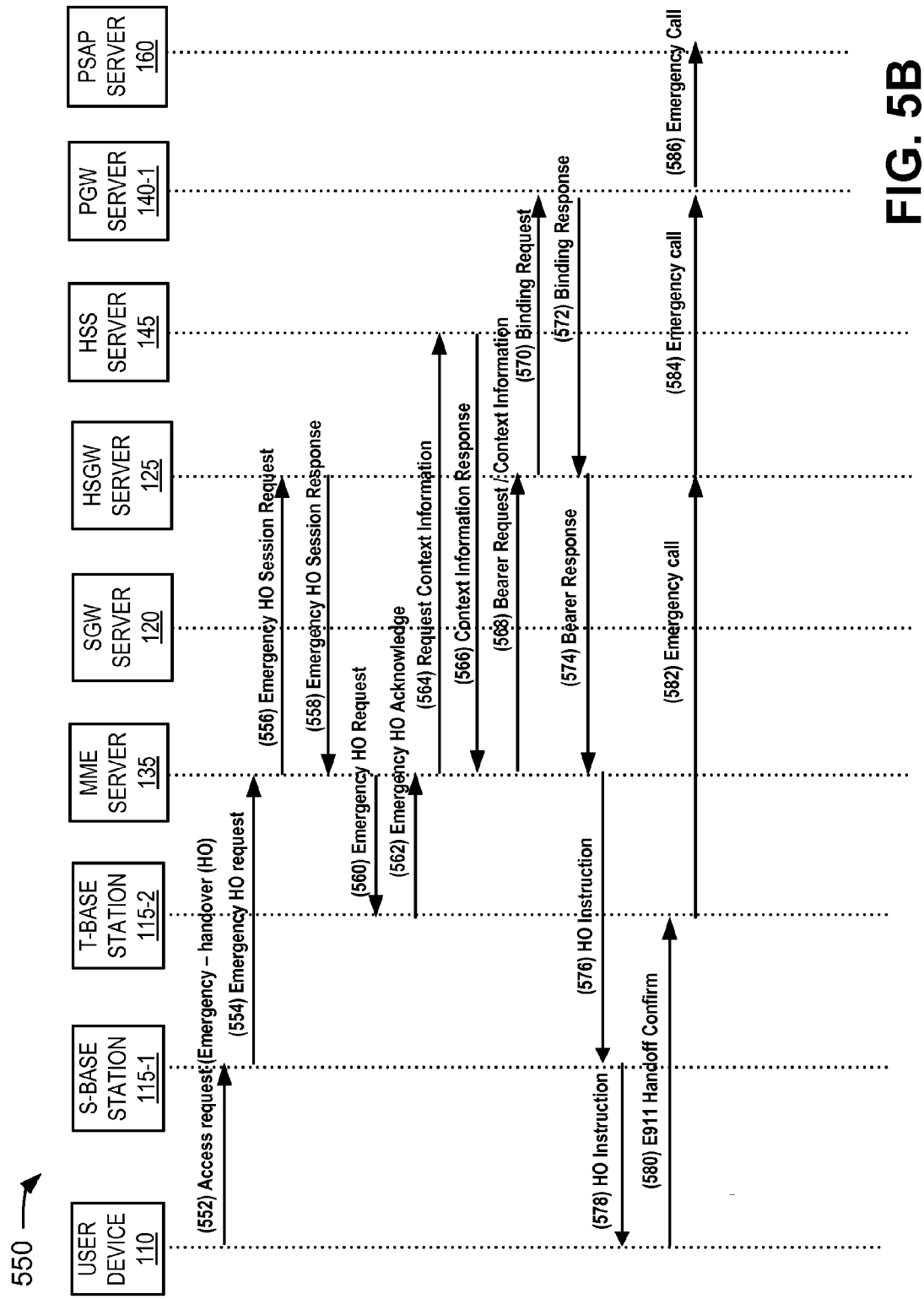

FIG. 5B is a diagram of example interactions between devices of an example portion 550 of the environment 100. As illustrated in FIG. 5B, example environment portion 550 may include user device 110, source base station 115-1 (hereinafter referred to as "S-base station 115-1"), target base station 115-2 (hereinafter referred to as "T-base station 115-2"), SGW 120, HSGW 125, MME 135, PGW 140-1, HSS server 145, and PSAP server 155. User device 110, S-base station 115-1, T-base station 115-2, SGW 120, HSGW 125, MME 135, PGW 140-1, HSS server 145, and PSAP server 155 may include the features described above in connection with one or more of FIGS. 1 and 2.

FIG. 5B describes example interactions, within example portion 550, for handing off an emergency call from first signal bearers, such as base station 115-1, SGW 120, and/or PGW 140-1 to second signal bearers, such as base station 115-2, HSGW 125, and/or PGW 140-1, for explanatory purposes. In another example, the interactions to handoff an emergency call could be described within another example portion 550 that includes a handoff from first signal bearers to third signal bearers, such as base station 115-M, ePDG 130, and/or PGW 140-1.

Assume, in the discussion below, that user device 110 has placed an emergency call, to PSAP server 155, via signal bearers, such as base station 115-1, SGW 120, and/or PGW 140-1, in a manner similar to that described above with respect to FIG. 5A. Assume further that user device 110 is exiting a cell associated with base station 115-1 and entering a cell associated with base station 115-2.

As shown in FIG. 5B, user device 110 may transmit an access request 552 (emergency-handover (HO)) to base station 115-1. Access request 552 may, in one example, include an NAS emergency indication (e.g., attach type=emergency-HO) which may indicate that an emergency call, initiated by user device 110, is being handed off to another base station 115 (e.g., base station 115-2). Base station 115-1 may receive access request 552 and may transmit an emergency handover request 554 to MME 135. MME 135 may receive emergency handover request 554 and may determine that emergency handover request 554 includes the emergency indication that the emergency call, initiated by user device 110, is being handed over to base station 115-2.

MME 135 may transmit a request to handover the emergency call, as emergency HO session request 556, to HSGW 125 which serves base station 115-2. HSGW 125 may receive emergency HO session request 556 and may transmit an indication that the emergency handover session can be established, as emergency session response 558, to MME 135. MME 135 may receive the indication that the emergency handover session can be established and may transmit another request to handover the emergency call, as emergency HO request 560, to base station 115-2. Base station 115-2 may receive emergency HO request 560 and may transmit an acknowledgement that the emergency call is to be handed over, as emergency HO acknowledge 562, to MME 135.

MME 135 may receive the acknowledgement and may transmit a request 564 for context information, associated with user device 110, to HSS server 145. HSS server 145 may receive request 564 for context information and may retrieve context information associated with user device 110. The context information may include information associated with user device 110 (e.g., an MDN, a MAC address, etc.) and/or information that identifies signal bearers, such as base station 115-1, SGW 120, PGW 140-1, etc., via which the emergency call was initiated. HSS server 145 may transmit the context information, as context information response 566, to MME 135.

MME 135 may receive context information response 566 and may obtain, from the context information, information associated PGW 140-1 via which the emergency call was initiated. MME 135 may transmit a bearer request, as bearer request/context information 568, to HSGW 125. HSGW 125 may receive the bearer request and may obtain the context information from the bearer request. HSGW 125 may use the context information to identify PGW 140-1 with which to establish a connection that allows the emergency call to be transferred to PSAP server 155. In another example implementation, HSGW 125 may communicate with HSS server 145 to obtain the context information.

HSGW 125 may communicate with PGW 140-1 to establish the connection, as binding request 570, and PGW 140-1 may establish the connection with HSGW 125 as a result of the communication. PGW 140-1 may transmit an indication that the connection has been established, as binding response 572, to HSGW 125. HSGW 125 may receive the indication that the connection has been established and may transmit an indication that signal bearers to which the emergency call is to be handed off has been established, as bearer response 574, to MME 135. MME 135 may receive the indication that the signal bearers have been established and may transmit an instruction to handoff user device 110 to base station 115-2, as HO instruction 576, to base station 115-1. Base station 115-1 may receive the instruction and may transmit another instruction to handoff user device 110 to base station 115-2, as HO instruction 578. User device 110 may receive the other instruction and may transmit a confirmation that user device 110 is ready to communicate, as emergency handoff confirm 580, to base station 115-2. Base station 115-2 may receive the confirmation and may transfer the emergency call, as emergency call 582, to HSGW 125. HSGW 125 may receive the emergency call and may transfer the emergency call, as emergency call 584, to PGW 140-1. PGW 140-1 may receive the emergency call and may transfer the emergency call, as emergency call 586, to PSAP server 155.

Systems and/or methods, described herein, may enable an emergency call, placed to a PSAP server, to be handed off between an LTE network and another network that is not an LTE network. The systems and/or methods may allow a network, to which the user device is being handed off, to distinguish between an emergency call that is being initiated by the user device and an emergency call that is being handed off. The systems and/or methods may allow the network, based on a determination that the emergency call is associated with a handoff, to obtain information that identifies a PGW device, associated with the other network, via which the emergency call was placed prior to being handed off. The network may forward the emergency call to the identified PGW device, associated with the other network, rather than via another PGW device, associated with the network. Routing the emergency call to the identified PGW device may enable the emergency call to be maintained during the handoff. Routing the emergency call, via the identified PGW device, may also allow the call to be placed within a time period that is less than another time period associated with handing over a normal call (e.g., a call that is not associated with an emergency call) or a time period associated with establishing another emergency call between the user device and the PSAP via the other PGW.

The foregoing description provides illustration and description, but is not intended to be exhaustive or to limit the implementations to the precise form disclosed. Modifications and variations are possible in light of the above teachings or may be acquired from practice of the embodiments.

While a series of blocks has been described with regard to FIG. 4, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an application-specific integrated circuit (ASIC), or a field-programmable gate array (FPGA), or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device comprising:
one or more processors to:
receive, from a user device, a request to establish a communication session to allow an emergency call to be placed or transferred to a public safety access point (PSAP) server,
determine whether the request includes a first indication that the emergency call is being initiated via the user device or a second indication that the emergency call is being handed off from a base station associated with another network device,
connect the emergency call to the PSAP server when the request includes the first indication, wherein, when connecting the emergency call, the one or more processors are further configured to:
communicate with a further network device to determine whether the user device is authenticated,
place the call to the PSAP server via a first gateway device associated with the network device, based on a notification, received from the further network device, that the user device is authenticated, and
place the call to the PSAP server via a third gateway device based on another notification, received from the further network device, that the user device is not authenticated, and
transfer the emergency call, to the PSAP server and via a second gateway device associated with the other network device, when the request includes the second indication, wherein the second gateway device processes the emergency call prior to being handed off from the base station.

2. The device of claim 1, where the other network device is associated with a long term evolution (LTE) network that is based on a Third Generation Partnership Project (3GPP) standard and where the network device is not associated with the LTE network.

3. The device of claim 2, wherein, when transferring the emergency call, to the PSAP server and via the second gateway device, the one or more processors are further configured to:
obtain, from the other network device, context information associated with the user device, wherein the context information identifies that the second gateway device processes the emergency call prior to being handed off from the base station.

4. The device of claim 2, where the first indication is based on a non-access stratum (NAS) message, which identifies the emergency call as being initiated by the user device, and where the second indication is based on another NAS message that identifies the emergency call as not being initiated by the user device or as being handed over from the base station.

5. A system comprising:
one or more devices configured to:
receive, from a user device and via a first base station, a request to establish a communication session of a call,
determine, in response to the request, whether the call is associated with an emergency call or a non-emergency call,
establish the communication session to allow the call to be placed as the non-emery call when the request does not include an indication that the call is the emergency call,
establish the communication session, via the first base station and a first gateway device, to allow the call to be placed, as a first emergency call, when the request includes a first indication to place the call as the first emergency call, and
establish the communication session, via the first base station and a second gateway device, to allow the call to be handed off, as a second emergency call and from a second base station, when the request includes a second indication that the second emergency call is to be handed off, wherein the second emergency call is established via the second gateway device, and wherein, when establishing the communication session via the first base station and the second gateway device, the one or more devices are further configured to:
retrieve, from a server device, information that identifies the second gateway device as a device via which the second emergency call was initiated, and
transmit an instruction to transfer the second emergency call to the second gateway device based on the information that identifies the second gateway device.

6. The system of claim 5, where the second base station is associated with a long term evolution (LTE) network that is based on a Third Generation Partnership Project (3GPP) standard, and the first base station is not associated with the LTE network.

7. The system of claim 5, where the first base station is associated with a long term evolution (LTE) network that is based on a Third Generation Partnership Project (3GPP) standard, and the second base station is not associated with the LTE network.

8. The system of claim 5, where the first indication includes a non-access stratum (NAS) message, which indicates that the first emergency call is being initiated, and where the second indication includes another NAS message, which indicates that the second emergency call is being handed off.

9. A system comprising:
one or more devices configured to:
receive, from a user device and via a first base station, a request to establish a communication session of a call,
determine, in response to the request, whether the call is associated with an emergency call or a non-emergency call,
establish the communication session to allow the call to be placed as the non-emergency call when the request does not include an indication that the call is the emergency call,
establish the communication session, via the first base station and a first gateway device, to allow the call to be placed, as a first emergency call, when the request includes a first indication to place the call as the first emergency call, and
establish the communication session, via the first base station and a second gateway device, to allow the call to be handed off, as a second emergency call and from a second base station, when the request includes a second indication that the second emergency call is to be handed off, wherein the second emergency call is established via the second gateway device, and wherein, when establishing the communication session, via the first base station and the first gateway device, the one or more devices are further configured to:
transmit, to a server device, information associated with the first base station or information associated with a location of the user device that allows the server device to identify a public safety access point (PSAP) server to which the first emergency call is to be placed,
receive, from the server device, information that identifies the PSAP server to which the first emergency call is to be placed, and
place the call, to the identified PSAP server, via the first base station and the first gateway device.

10. The system of claim 9, wherein the second base station is associated with a long term evolution (LTE) network that is based on a Third Generation Partnership Project (3GPP) standard, and the first base station is not associated with the LTE network.

11. The system of claim 9, wherein the first base station is associated with a long term evolution (LTE) network that is based on a Third Generation Partnership Project (3GPP) standard, and the second base station is not associated with the LTE network.

12. The system of claim 9, wherein the first indication includes a non-access stratum (NAS) message, which indicates that the first emergency call is being initiated, and wherein the second indication includes another NAS message, which indicates that the second emergency call is being handed off.

* * * * *